United States Patent
Lozhkin et al.

(10) Patent No.: US 11,387,878 B1
(45) Date of Patent: Jul. 12, 2022

(54) WIRELESS COMMUNICATION APPARATUS AND WIRELESS COMMUNICATION METHOD

(71) Applicant: FUJITSU LIMITED, Kawasaki (JP)

(72) Inventors: Alexander Nikolaevich Lozhkin, Kawasaki (JP); Tomoya Ota, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/471,381

(22) Filed: Sep. 10, 2021

(30) Foreign Application Priority Data

Dec. 21, 2020 (JP) .............................. JP2020-211422

(51) Int. Cl.
*H04B 7/06* (2006.01)
*H04B 7/0404* (2017.01)

(52) U.S. Cl.
CPC ......... *H04B 7/0617* (2013.01); *H04B 7/0404* (2013.01)

(58) Field of Classification Search
CPC ............................ H04B 7/0617; H04B 7/0404
See application file for complete search history.

(56) References Cited

U.S. PATENT DOCUMENTS

| 2008/0043818 A1* | 2/2008 | Tal ............................ H03L 7/08 375/135 |
| 2014/0340260 A1* | 11/2014 | Richards .................. H01Q 3/34 342/377 |
| 2015/0071381 A1* | 3/2015 | Nadiri .................... H04L 27/364 375/296 |

FOREIGN PATENT DOCUMENTS

JP    2003-060424 A    2/2003

* cited by examiner

*Primary Examiner* — Vineeta S Panwalkar
(74) *Attorney, Agent, or Firm* — Myers Wolin, LLC

(57) ABSTRACT

A wireless communication apparatus includes: a plurality of antenna elements; a processor that outputs an in-phase signal and a quadrature signal; a splitter that distributes the in-phase signal and the quadrature signal to the antenna elements; and a plurality of quadrature modulators that generate transmission signals of a radio frequency by performing quadrature modulation on the in-phase signals and the quadrature signals. The processor is configured to execute a process including applying a first frequency shift according to a transmission beam direction to a first oscillation signal that is supplied to the quadrature modulators, digitally modulating transmission data to generate the in-phase signal and the quadrature signal, and performing complex multiplication to the in-phase signal and the quadrature signal with a second oscillation signal to which a second frequency shift opposite from the first frequency shift is applied.

10 Claims, 5 Drawing Sheets

WIRELESS COMMUNICATION APPARATUS AND WIRELESS COMMUNICATION METHOD

CROSS-REFERENCE TO RELATED APPLICATION

This application is based upon and claims the benefit of priority of the prior Japanese Patent Application No. 2020-211422, filed on Dec. 21, 2020, the entire contents of which are incorporated herein by reference.

FIELD

The embodiments discussed herein are related to a wireless communication apparatus and a wireless communication method.

BACKGROUND

With the 5th Generation Mobile Communication System (5G), use of millimeter waves with a wavelength of 1 to 10 mm, for example, for data communication is discussed. The use of millimeter waves makes it possible to perform data communication with a wider frequency bandwidth, and it is expected to improve the data rate. On the other hand, millimeter waves have a characteristic of being greatly attenuated when propagating through a space. Therefore, in communication using millimeter waves, beamforming may be performed by using an array antenna including a large number of antenna elements, for example.

The "beamforming" means to form a beam with a high gain in a predetermined direction by providing a phase shifter to each of a plurality of antenna elements to set a phase difference in signals transmitted from the respective antenna elements. Relatively expensive variable phase shifters are provided to the respective antenna elements for beamforming using the phase shifters, so that the cost for the array antenna increases. Thus, as a radar and the like using an array antenna, for example, there is a type that performs frequency scanning mode beamforming that forms a beam by giving a phase difference in the signals of the respective antenna elements by a frequency shift. With the frequency scanning mode beamforming, it is possible to form a beam in a predetermined direction by providing mixers for up-conversion or down-conversion to the respective antenna elements and adjusting the frequencies of oscillation signals supplied to the mixers from an oscillator such as a local voltage controlled oscillator (VCO), for example.

With the frequency scanning mode beamforming, however, a frequency shift according to the beam direction is given to the signals transmitted and received at the respective antenna elements so that the frequencies of the transmitted and received signals vary depending on the beam directions. Therefore, with a wireless communication apparatus in which the frequency of the signals used for communication is defined, it is difficult to switch the beam to a predetermined direction only by providing the mixers to the respective antenna elements. Therefore, considered is a wireless communication apparatus in which the mixers are provided to the respective antenna elements and, at the same time, an intermediate frequency (IF) mixer is provided to a circuit of a previous stage where the antenna elements are branched. With such a configuration, the intermediate frequency mixer can apply, to the signals, a frequency shift opposite from the frequency shift applied by the mixers of the respective antenna elements. Therefore, the frequencies of the signals to be transmitted and received can be made constant regardless of the beam directions.

Patent document 1: Japanese Laid-open Patent Publication No. 2003-060424

However, with the wireless communication apparatus that performs beamforming by the frequency scanning mode as described above, the circuit scale increases. Specifically, since image components having image frequencies different from a desired frequency are generated in the output from the intermediate frequency mixer and the mixers of the respective antenna elements so that a band pass filter (BPF) for removing the image components is provided, thereby increasing the circuit scale.

For example, a case of upconverting a signal with an intermediate frequency $f_{IF}$ by a mixer of an antenna element will be considered. It is assumed that an oscillation signal with a local frequency $f_{LO}$ is supplied to the mixer of the antenna element from a local VCO, for example. At this time, when a signal IF with the intermediate frequency $f_{IF}$ is input to the mixer and upconverted, a signal RF2 with a radio frequency $f_{RF2}$ ($=f_{LO}+f_{IF}$) as a desired frequency and an image component RF1 with a radio frequency $f_{RF1}$ ($=f_{LO}-f_{IF}$) with the local frequency $f_{LO}$ of an oscillation signal LO being the center frequency are output as illustrated in FIG. 5, for example.

In such a case, a BPF that removes the image component RF1 while allowing the signal RF2 with the radio frequency $f_{RF2}$ to transmit therethrough is provided in a latter stage of the mixer so that the image component RF1 is not emitted from the antenna element. That is, the BPF for removing the image component is provided to each of the antenna elements.

Furthermore, in a case where the intermediate frequency mixer is provided for canceling the frequency shift in the mixers of the respective antenna elements, the image component also appears in the output of the intermediate frequency mixer. Therefore, the BPF for removing the image component from the output of the intermediate frequency mixer is also provided in the previous state where the antenna elements are branched. Since the frequency shift at the mixer of each of the antenna elements changes depending on the beam direction, the frequency of the signal for canceling the frequency shift may also change. As a result, a BPF with a variable transmission passband is used as the BPF for removing the image component from the output of the intermediate frequency mixer. Therefore, an increase in the circuit scale due to the added BPFs is more prominent.

SUMMARY

According to an aspect of an embodiment, a wireless communication apparatus includes: a plurality of antenna elements; a processor that outputs an in-phase signal and a quadrature signal; a splitter that distributes the in-phase signal output from the processor to the antenna elements, and distributes the quadrature signal output from the processor to the antenna elements; and a plurality of quadrature modulators that are provided to the respective antenna elements, and that generate transmission signals of a radio frequency to be transmitted from the respective antenna elements by performing quadrature modulation on the in-phase signals and the quadrature signals distributed by the splitter. The processor is configured to execute a process including applying a first frequency shift according to a transmission beam direction to a first oscillation signal that is supplied to the quadrature modulators and used for frequency conversion into the radio frequency, digitally modulating transmission data to generate the in-phase signal and the quadrature signal, and performing complex multiplication to the generated in-phase signal and the generated quadrature signal with a second oscillation signal to which a second frequency shift opposite from the first frequency shift is applied.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Note that the present invention is not limited by the embodiments.

[a] First Embodiment

Figure 1:
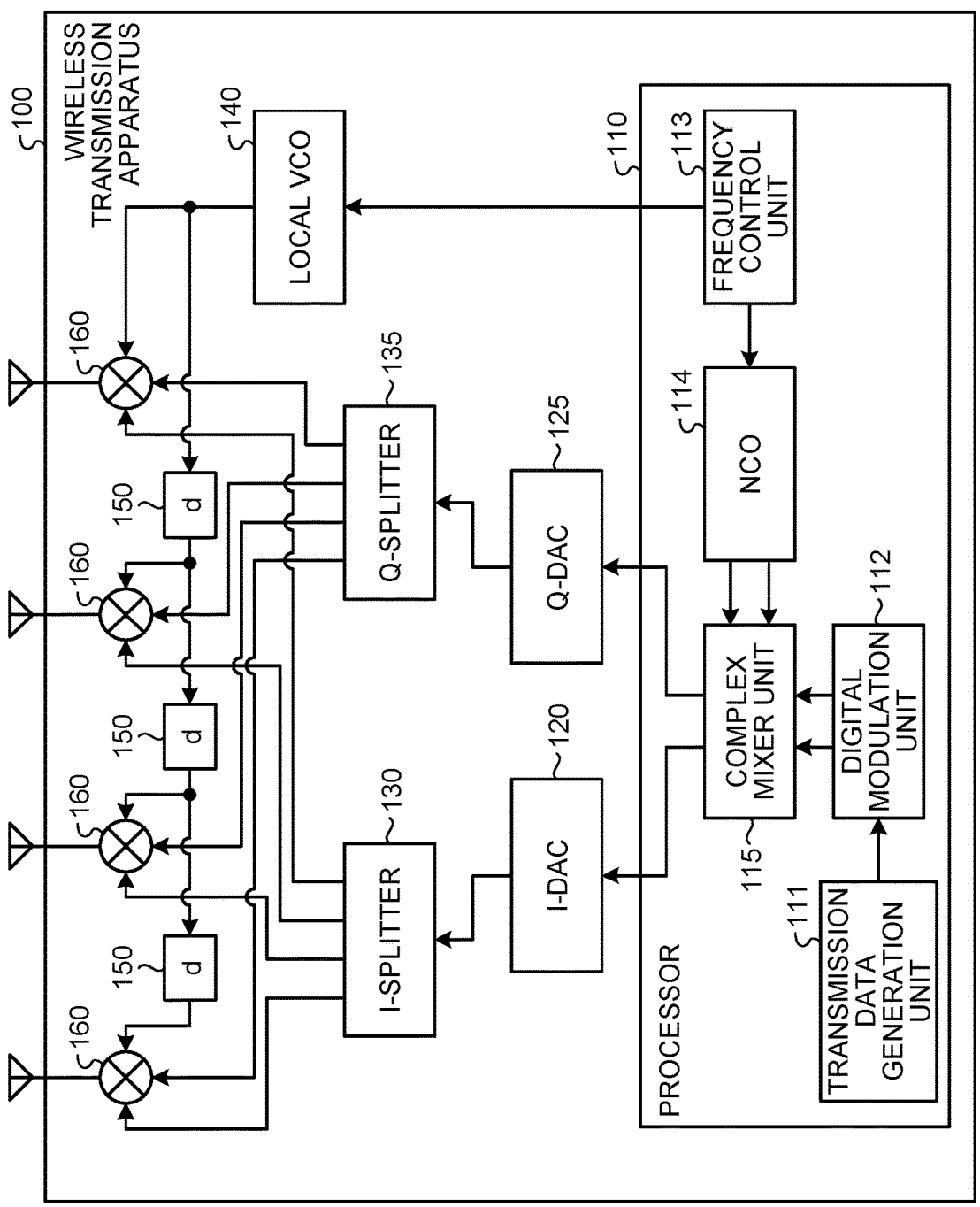
FIG. 1 is a block diagram illustrating a configuration of a wireless transmission apparatus according to a first embodiment.

FIG. 1 is a block diagram illustrating a configuration of a wireless transmission apparatus 100 according to a first embodiment. The wireless transmission apparatus 100 illustrated in FIG. 1 includes a processor 110, an I-digital/analog converter (I-DAC) 120, a Q-DAC 125, an I-splitter 130, a Q-splitter 135, a local voltage controlled oscillator (VCO) 140, delay devices 150, and IQ modulators 160.

The processor 110 includes a central processing unit (CPU), a field programmable gate array (FPGA), a digital signal processor (DSP) or the like, for example, and integrally controls the entire wireless transmission apparatus 100. Specifically, the processor 110 includes a transmission data generation unit 111, a digital modulation unit 112, a frequency control unit 113, a numerically controlled oscillator (NCO) 114, and a complex mixer unit 115.

The transmission data generation unit 111 executes encoding and the like of transmitted information to generate transmission data.

The digital modulation unit 112 digitally modulates the transmission data to generate an in-phase (I) signal of common-mode component and a quadrature (Q) signal of quadrature component. The digital modulation unit 112 outputs the generated I signal and Q signal to the complex mixer unit 115.

The frequency control unit 113 controls the frequencies of oscillation signals output from the NCO 114 and the local VCO 140. Specifically, the frequency control unit 113 determines the frequency shift amount corresponding to the direction of the beam formed by the wireless transmission apparatus 100, and increases/decreases the frequency of the oscillation signal output from the local VCO 140 for the determined frequency shift amount. Furthermore, the frequency control unit 113 increases/decreases the frequency of the oscillation signal output from the NCO 114 so as to shift the frequency in the direction opposite from the frequency shift of the local VCO 140. That is, when increasing the frequency of the oscillation signal output from the local VCO 140 by $\Delta f(\theta)$, for example, the frequency control unit 113 decreases the frequency of the oscillation signal output from the NCO 114 by $\Delta f(\theta)$. Similarly, when decreasing the frequency of the oscillation signal output from the local VCO 140 by $\Delta f(\theta)$, the frequency control unit 113 increases the frequency of the oscillation signal output from the NCO 114 by $\Delta f(\theta)$.

The NCO 114 is an oscillator that generates the oscillation signal configured with a complex sine wave for mutually converting a baseband frequency and an intermediate frequency. That is, the NCO 114 generates the oscillation signal for conversion of the baseband frequency and the intermediate frequency, and outputs a real part and an imaginary part of the oscillation signal to the complex mixer unit 115. At this time, the NCO 114 outputs the oscillation signal to which frequency shift is applied according to an instruction from the frequency control unit 113.

The complex mixer unit 115 performs complex multiplication to the I signal and the Q signal of the baseband frequency output from the digital modulation unit 112 with the real part and the imaginary part of the oscillation signal output from the NCO 114, and outputs the I signal and the Q signal of the intermediate frequency. Since the complex mixer unit 115 executes the complex multiplication, which is digital processing, to the I signal and the Q signal, the complex mixer unit 115 outputs only the I signal and the Q signal of the intermediate frequency but not the image component.

The I-DAC 120 performs DA conversion on the I signal output from the complex mixer unit 115, and outputs the acquired analog I signal to the I-splitter 130.

The Q-DAC 125 performs DA conversion on the Q signal output from the complex mixer unit 115, and outputs the acquired analog Q signal to the Q-splitter 135.

The I-splitter 130 splits the I signal, and distributes those to a plurality of antenna elements that constitute an array antenna.

The Q-splitter 135 splits the Q signal, and distributes those to the antenna elements that constitute the array antenna.

The local VCO 140 is an oscillator that generates the oscillation signal for mutually converting the radio frequency and the intermediate frequency. That is, the local VCO 140 generates the oscillation signal for conversion of the radio frequency and the intermediate frequency, and outputs the oscillation signal to the IQ modulators 160 of the respective antenna elements. At this time, the local VCO 140 outputs the oscillation signal to which frequency shift is applied according to an instruction from the frequency control unit 113.

The delay device 150 adds a predetermined delay to a respective oscillation signal output from the local VCO 140. The delay device 150 between the neighboring antenna elements sequentially adds the delay to the oscillation signal to which a frequency shift in accordance with the beam direction is applied so as to set a phase difference corresponding to the beam directions for the oscillation signal supplied to the IQ modulators 160 of the neighboring antenna elements.

The IQ modulator 160 executes IQ modulation by using the I signal output from the I-splitter 130 and the Q signal output from the Q-splitter 135. At this time, the IQ modulator 160 uses the oscillation signal output from the local VCO 140 and delayed by the delay device 150 for generating a carrier (carrier wave) to generate a transmission signal of a radio frequency from the I signal and the Q signal of the intermediate frequency. The IQ modulator 160 executes IQ modulation using the I signal and the Q signal, so that output from the IQ modulator 160 is only a high-frequency signal to be transmitted and no image component is output.

As described, the IQ modulators 160 of the respective antenna elements use the oscillation signals with the phase difference corresponding to the respective beam directions set thereto for generating the carrier, so that the wireless transmission apparatus 100 can transmit the signals by forming the beams in a predetermined direction. Furthermore, since the frequency shift opposite from the frequency shift of the oscillation signal used by the IQ modulator 160 is applied to the oscillation signal from the NCO 114, the complex mixer unit 115 shifts the frequency of the I signal and the Q signal in accordance with the oscillation signal from the NCO 114. As a result, the frequency shift in the IQ modulator 160 is cancelled by the frequency shift in the complex mixer unit 115. Thereby, the frequencies of the high-frequency signals transmitted from the wireless transmission apparatus 100 are constant at a predetermined radio frequency.

Figure 2:
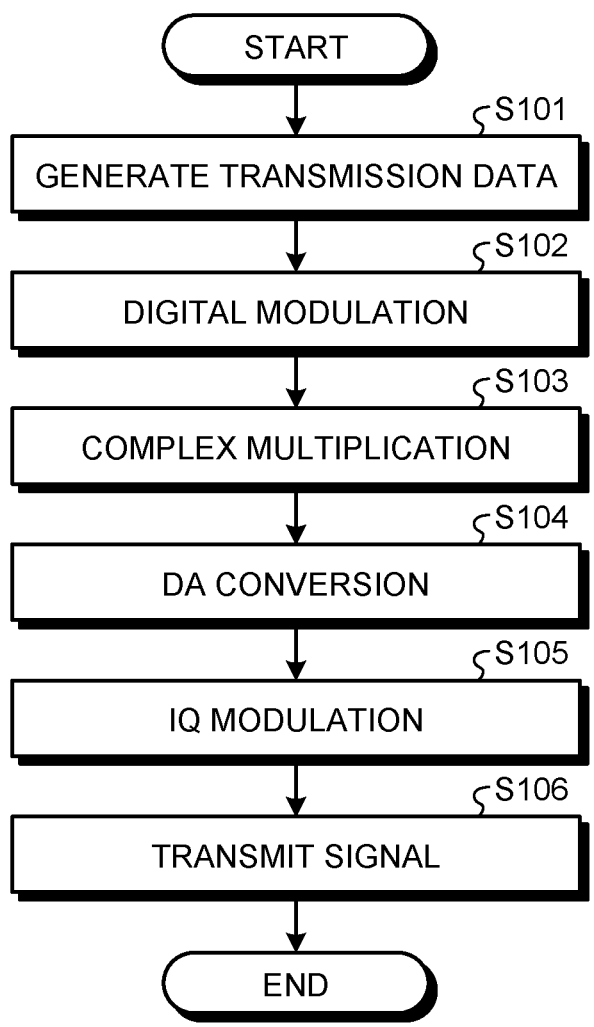
FIG. 2 is a flowchart illustrating a wireless communication method according to the first embodiment.

Next, a wireless communication method executed by the wireless transmission apparatus 100 configured in the above-described manner will be described with reference to a flowchart illustrated in FIG. 2.

First, the transmission data generation unit 111 executes encoding and the like of information to be transmitted to generate transmission data (step S101). The generated transmission data is digital-modulated by the digital modulation unit 112 (step S102), and the I signal and the Q signal are input to the complex mixer unit 115.

To the complex mixer unit 115, the oscillation signal for conversion into the intermediate frequency is supplied from the NCO 114. The oscillation signal is configured with a complex sine wave, and includes a real part and an imaginary part. Furthermore, the frequency of the oscillation signal increases/decreases by the frequency control unit 113 to cancel the frequency shift of the local VCO 140 corresponding to the beam direction. That is, when the frequency shift in the local VCO 140 corresponding to the beam direction is $\Delta f(\theta)$, for example, the frequency shift in the NCO 114 is $-\Delta f(\theta)$.

At this time, the NCO 114 supplies the oscillation signal in a digital area, so that it is possible to apply a positive/negative frequency shift with respect to 0 Hz to the oscillation signal. Therefore, compared to a case where the frequency shift is applied to the oscillation signal in an analog area, the absolute value of the frequency shift can be made to one half. For example, in a case where a frequency shift in a width of 2 GHz is applied in the analog area, a frequency shift of 0 to 2 GHz is to be applied. However, when applying a frequency shift in a width of 2 GHz in the digital area, a frequency shift of −1 to +1 GHz may be applied so that the absolute value of the frequency shift is only 1 GHz at the most.

When the oscillation signal to which such a frequency shift is applied is supplied to the complex mixer unit 115, complex multiplication to the I signal and the Q signal of the baseband frequency with the oscillation signal is executed (step S103). That is, the I signal and the Q signal are converted into the I signal and the Q signal of the intermediate frequency by digital processing. At this time, even when the I signal and the Q signal are subjected to frequency conversion, no image component is generated since complex multiplication is digital processing. Therefore, there is no necessity to remove the image component from the output of the complex mixer unit 115, so that there is no necessity to provide the filter such as the BPF. As a result, the increase in the circuit scale of the wireless transmission apparatus 100 can be suppressed.

The I signal of the intermediate frequency is input to the I-DAC 120, and the Q signal of the intermediate frequency is input to the Q-DAC 125. Then, the I signal and the Q signal are each subjected to DA conversion (step S104), and input to the I-splitter 130 and the Q-splitter 135, respectively. In the I-splitter 130, the I signal is distributed to the antenna elements. In the Q-splitter 135, the Q signal is distributed to the antenna elements. In each of the antenna elements, the I signal and the Q signal are each input to the IQ modulator 160.

To the IQ modulator 160, the oscillation signal for conversion into the radio frequency is supplied from the local VCO 140. The oscillation signal is delayed predetermined time by the respective delay devices 150 provided between the neighboring antenna elements, and is input to the IQ modulators 160 of the respective antenna elements. Furthermore, the frequency of the oscillation signal is shifted by the frequency control unit 113 according to the beam direction. That is, a frequency shift of $\Delta f(\theta)$, for example, corresponding to the beam direction is applied to the oscillation signal output from the local VCO 140.

By the IQ modulator 160 to which the oscillation signal for conversion into the radio frequency is supplied, the I signal and the Q signal of the intermediate frequency are IQ-modulated (step S105). That is, by using the oscillation signal for conversion into the radio frequency for generating the carrier and executing quadrature modulation by the I signal and the Q signal, a transmission signal of the radio frequency is acquired. At this time, no image component is generated even when IQ modulation is executed, so that there is no necessity to remove the image component from the output of the IQ modulator 160. Therefore, there is no necessity to provide the filter such as the BPF at the output stage of the IQ modulator 160 of each of the antenna elements. As a result, the increase in the circuit scale of the wireless transmission apparatus 100 can be suppressed.

Furthermore, to the oscillation signal supplied to the IQ modulator 160, a frequency shift according to the beam direction is applied. The oscillation signals are delayed predetermined time sequentially between the neighboring antenna elements, and are supplied to the IQ modulators 160. Thus, a phase difference is set to the signals output from each of the IQ modulators 160 of the antenna elements, and transmission beams directed toward a predetermined direction are formed. Since a frequency shift $-\Delta f(\theta)$ for canceling frequency shift $\Delta f(\theta)$ of the radio frequency is applied in advance to the oscillation signal supplied to the complex mixer unit 115, the radio frequency of the signals output from the IQ modulators 160 does not deviate from the radio frequency defined in a wireless communication system.

In this manner, the transmission signals output from the IQ modulators 160 are transmitted from the respective antenna elements (step S106). That is, the signals of the radio frequency defined in the wireless communication system are transmitted to the beam direction according to the frequency shift.

As described above, according to the embodiment, the frequency of the I signal and the Q signal is shifted and converted into the intermediate frequency by executing complex multiplication as the digital processing, and the I signal and the Q signal are subjected to DA conversion, respectively. Furthermore, in each of the antenna elements, IQ modulation of the I signal and the Q signal is executed by using the oscillation signal to which frequency shift is applied according to the beam direction so as to generate the transmission signal of the radio frequency. Since frequency conversion is performed by complex multiplication and IQ modulation, no image component is generated at the time of frequency conversion. Therefore, there is no necessity to provide the filter such as the BPF for removing the image component. As a result, it is possible to suppress the increase in the circuit scale of the wireless transmission apparatus. Furthermore, the frequency shift applied according to the beam direction is canceled by the frequency shift applied at the time of conversion into the intermediate frequency, so that the frequencies of the high-frequency signals emitted from the antenna elements can be made constant.

[b] Second Embodiment

While a case of forming the transmission beam by frequency scanning is described in the first embodiment, it is possible to suppress the increase in the circuit scale also in a case of forming a reception beam by frequency scanning. Thus, in a second embodiment, a case of forming the reception beam by frequency scanning will be described.

Figure 3:
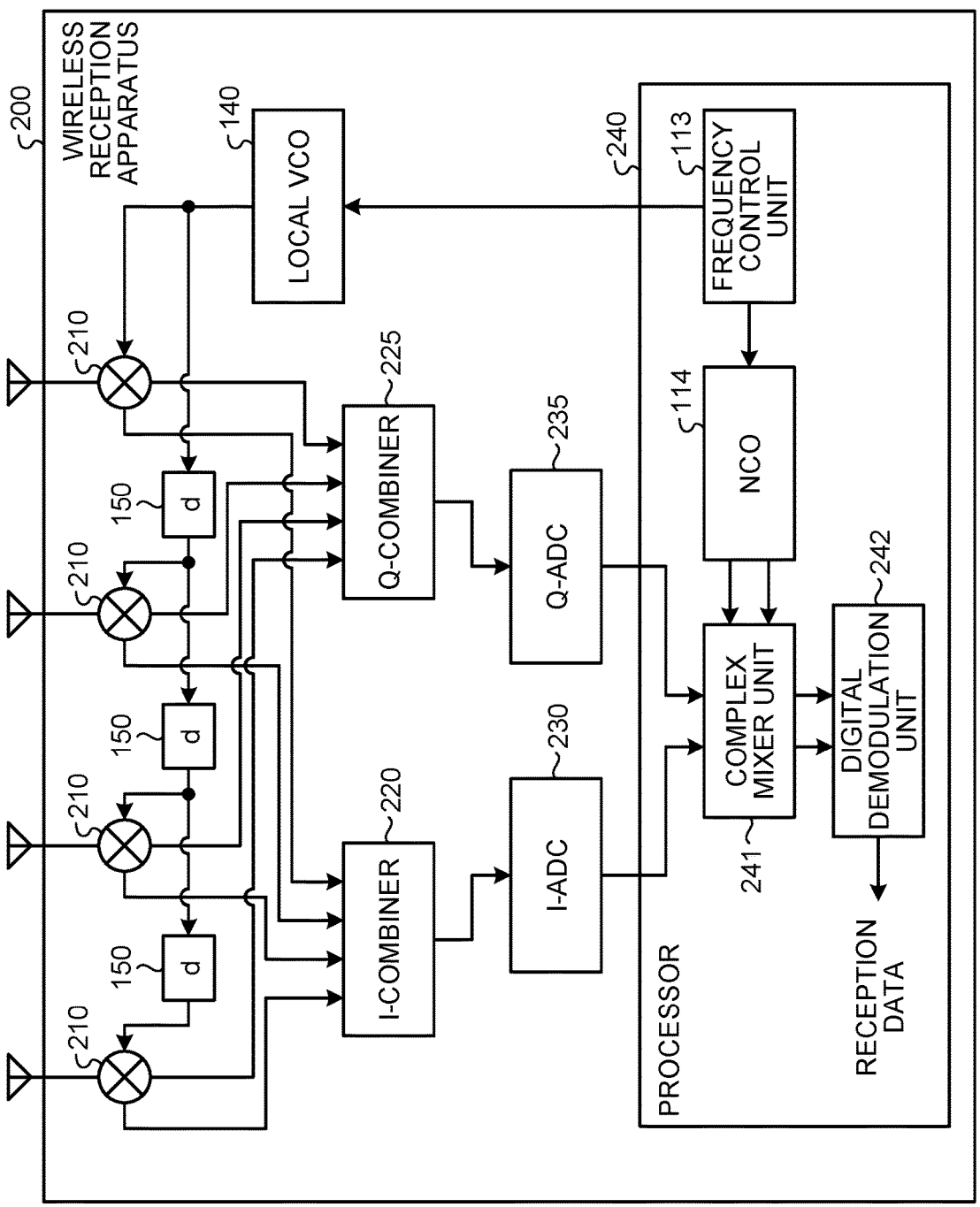
FIG. 3 is a block diagram illustrating a configuration of a wireless reception apparatus according to a second embodiment.

FIG. 3 is a block diagram illustrating a configuration of a wireless reception apparatus 200 according to the second embodiment. In FIG. 3, the same reference signs are applied to the elements the same as those of FIG. 1 and explanations thereof are omitted. The wireless reception apparatus 200 illustrated in FIG. 3 includes the local VCO 140, the delay devices 150, IQ demodulators 210, an I-combiner 220, a Q-combiner 225, an I-analog/digital converter (ADC) 230, a Q-ADC 235, and a processor 240.

The IQ demodulator 210 is provided to each of the antenna elements, and performs IQ demodulation to the reception signal received at each of the antenna elements. At this time, the IQ demodulator 210 uses the oscillation signal output from the local VCO 140 and delayed in the delay device 150 for removing the carrier (carrier wave) so as to generate the I signal and the Q signal of the intermediate frequency from the reception signal of the radio frequency. The IQ demodulator 210 performs IQ demodulation to the reception signal, so that only the I signal and the Q signal are output from the IQ demodulator 210, and no image component is output.

The IQ demodulators 210 of the respective antenna elements use the oscillation signals where a phase difference is set by a frequency shift corresponding to the respective beam directions for removing the carrier. Therefore, the wireless reception apparatus 200 can receive the signals by forming the beams in a desired direction.

The I-combiner 220 combines I signals output from the IQ demodulators 210 of the respective antenna elements, and outputs a single I signal acquired by combining the I signals to the I-ADC 230.

The Q-combiner 225 combines Q signals output from the IQ demodulators 210 of the respective antenna elements, and outputs a single Q signal acquired by combining the Q signals to the Q-ADC 235.

The I-ADC 230 performs AD conversion to the I signal output from the I-combiner 220, and outputs the acquired digital I signal to the processor 240.

The Q-ADC 235 performs AD conversion to the Q signal output from the Q-combiner 225, and outputs the acquired digital Q signal to the processor 240.

The processor 240 includes a CPU, a FPGA, a DSP or the like, for example, and integrally controls the entire wireless reception apparatus 200. Specifically, the processor 240 includes the frequency control unit 113, the NCO 114, a complex mixer unit 241, and a digital demodulation unit 242.

The complex mixer unit 241 performs complex multiplication to the I signal and the Q signal of the intermediate frequencies output from the I-ADC 230 and the Q-ADC 235 with the real part and the imaginary part of the oscillation signal output from the NCO 114, and outputs the I signal and the Q signal of the baseband frequency. Since the complex mixer unit 241 executes the complex multiplication, which is digital processing, to the I signal and the Q signal, only the I signal and the Q signal of the baseband frequency are output from the complex mixer unit 241, and no image component is output.

Furthermore, since the frequency shift opposite from the frequency shift of the oscillation signal used by the IQ demodulator 210 is applied to the oscillation signal from the NCO 114, the complex mixer unit 241 performs a frequency shift to the I signal and the Q signal in accordance with the oscillation signal from the NCO 114. As a result, the frequency shift in the IQ demodulator 210 is cancelled by the frequency shift in the complex mixer unit 241. Thereby, the frequencies of the I signal and the Q signal processed in the processor 240 are constant at a predetermined baseband frequency.

The digital demodulation unit 242 digitally demodulates the I signal and the Q signal, and outputs acquired reception data.

Figure 4:
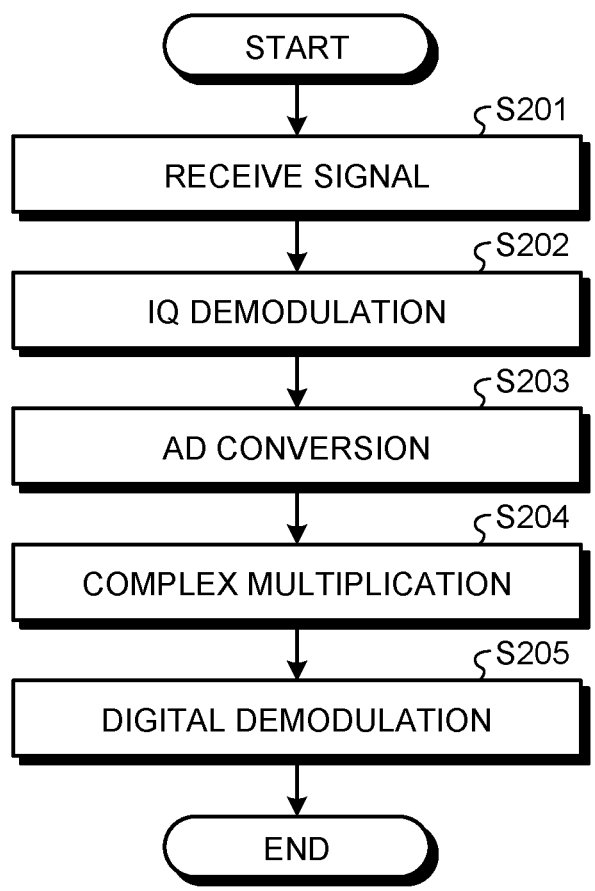
FIG. 4 is a flowchart illustrating a wireless communication method according to the second embodiment.
Figure 5:
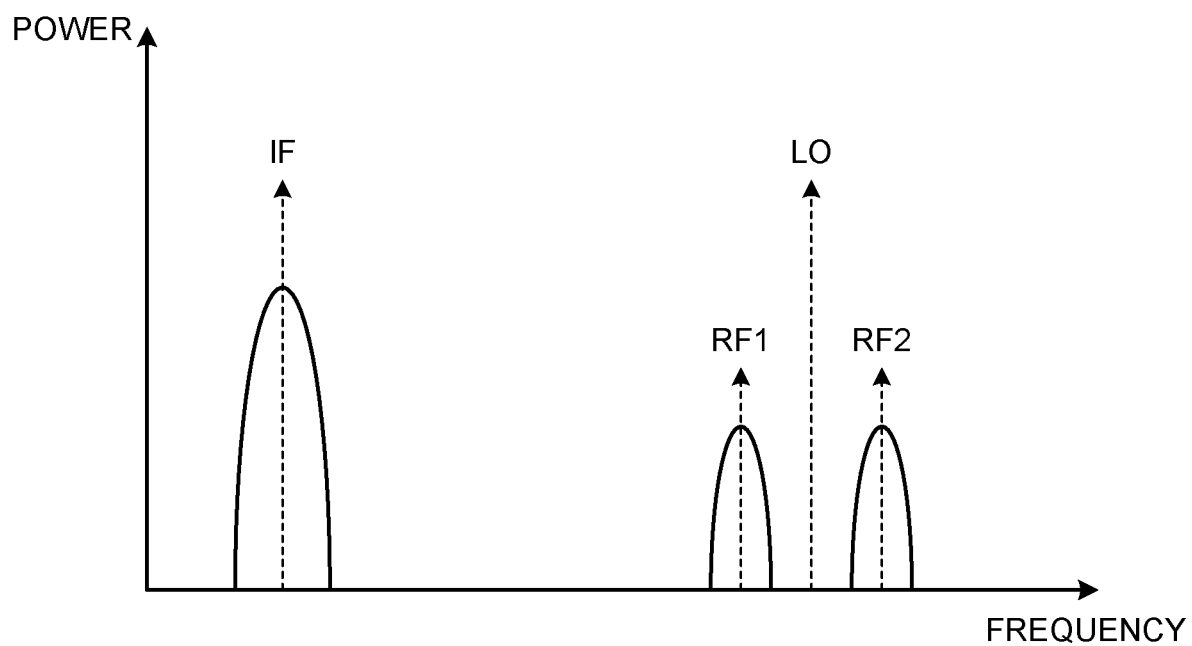
FIG. 5 is a chart for describing a specific example of up-conversion.

Next, a wireless communication method executed by the wireless reception apparatus 200 configured in the above-described manner will be described with reference to a flowchart illustrated in FIG. 4.

To the IQ demodulator 210, the oscillation signal for conversion into the intermediate frequency is supplied from the local VCO 140. The oscillation signal is delayed predetermined time by the respective delay devices 150 provided between the neighboring antenna elements, and is input to the IQ demodulators 210 of the respective antenna elements. Furthermore, the frequency of the oscillation signal is shifted by the frequency control unit 113 according to the beam direction. That is, a frequency shift of $\Delta f(\theta)$, for example, corresponding to the beam direction is applied to the oscillation signal output from the local VCO 140.

As described above, the oscillation signal, to which frequency shift is applied, is delayed and supplied to the IQ demodulator 210, so that reception beams with a large gain of the antenna elements are formed in a predetermined direction. When signals are received by the reception beams (step S201), IQ demodulation of the reception signals is executed by the IQ demodulators 210 of the respective antenna elements (step S202). That is, by using the oscillation signal for conversion into the intermediate frequency for removing the carrier and executing quadrature demodulation of the reception signals, the I signal and the Q signal of the intermediate frequency are acquired. At this time, no image component is generated even when IQ demodulation is executed, so that there is no necessity to remove the image component from the output of the IQ demodulator 210.

Therefore, there is no necessity to provide the filter such as the BPF at the output stage of the IQ demodulator 210 of each of the antenna elements. As a result, the increase in the circuit scale of the wireless reception apparatus 200 can be suppressed.

The I signal of each of the antenna elements is input to the I-combiner 220, and the Q signal of each of the antenna elements is input to the Q-combiner 225. Then, the I signals and the Q signals are combined, respectively, and the I signal is AD-converted by the I-ADC 230 while the Q signal is AD-converted by the Q-ADC 235 (step S203). Thereafter, the digital I signal and Q signal are input to the complex mixer unit 241 of the processor 240.

To the complex mixer unit 241, the oscillation signal for conversion into the baseband frequency is supplied from the NCO 114. The oscillation signal is configured with a complex sine wave, and includes a real part and an imaginary part. Furthermore, the frequency of the oscillation signal increases/decreases by the frequency control unit 113 to cancel the frequency shift of the local VCO 140 corresponding to the beam direction. That is, when the frequency shift in the local VCO 140 corresponding to the beam direction is $\Delta f(\theta)$, for example, the frequency shift in the NCO 114 is $-\Delta f(\theta)$.

At this time, the NCO 114 supplies the oscillation signal in a digital area, so that it is possible to apply a positive/negative frequency shift with respect to 0 Hz to the oscillation signal. Therefore, compared to a case where a frequency shift is applied to the oscillation signal in an analog area, the absolute value of the frequency shift can be made to one half. For example, in a case where a frequency shift in a width of 2 GHz is applied in the analog area, a frequency shift of 0 to 2 GHz is to be applied. However, when applying a frequency shift in a width of 2 GHz in the digital area, frequency shift of −1 to +1 GHz may be applied so that the absolute value of the frequency shift is only 1 GHz at the most.

When the oscillation signal to which such a frequency shift is applied is supplied to the complex mixer unit 241, complex multiplication to the I signal and the Q signal of the intermediate frequency with the oscillation signal is executed (step S204). That is, the I signal and the Q signal are converted into the I signal and the Q signal of the baseband frequency by digital processing. At this time, even when the frequency of the I signal and the Q signal is converted, no image component is generated since complex multiplication is digital processing. Therefore, there is no necessity to remove the image component from the output of the complex mixer unit 241, so that there is no necessity to provide the filter such as the BPF. As a result, the increase in the circuit scale of the wireless reception apparatus 200 can be suppressed.

Furthermore, since the frequency shift for canceling the frequency shift in the radio frequency is applied to the oscillation signal supplied to the complex mixer unit 241, there is no change in the baseband frequency of the signals output from the complex mixer unit 241 caused by the frequency shift.

The I signal and the Q signal subjected to frequency conversion are converted into the baseband frequency are digitally demodulated by the digital demodulation unit 242 (step S205) to acquire reception data.

As described above, according to the embodiment, in each of the antenna elements, IQ demodulation of the I signal and the Q signal is executed by using the oscillation signal to which frequency shift is applied according to the beam direction so as to generate the I signal and the Q signal of the intermediate frequency from the reception signal. Then, the I signal and the Q signal are subjected to AD conversion, and the frequencies of the I signal and the Q signal are converted into the baseband frequency by performing complex multiplication that is the digital processing. Since frequency conversion is performed by IQ demodulation and complex multiplication, no image component is generated at the time of frequency conversion. Therefore, there is no necessity to provide the filter such as the BPF for removing the image component. As a result, it is possible to suppress the increase in the circuit scale of the wireless reception apparatus. Furthermore, the frequency shift according to the beam direction is canceled by the frequency shift applied at the time of conversion into the baseband frequency, so that the baseband frequency can be made constant without being affected by the frequency shift applied for beamforming.

Note that it is also possible to combine the first and second embodiments so as to allow a wireless communication apparatus to form both transmission beams and reception beams by frequency scanning. Furthermore, the wireless transmission apparatus 100 according to the first embodiment or the wireless reception apparatus 200 according to the second embodiment may be applied to a distributed unit (DU) connected to a central unit (CU) or may be applied to a radio unit (RU) connected to the CU/DU. In such cases, the I signal and the Q signal of the baseband frequency generated by the CU or the DU may be input to the DU or the RU, and the frequencies of the I signal and the Q signal may be converted in the DU or the RU by the complex multiplication with the oscillation signal.

According to an aspect of the wireless communication apparatus and the wireless communication method disclosed in the present application, the increase in the circuit scale can be suppressed.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication apparatus comprising:
   a plurality of antenna elements;
   a processor that outputs an in-phase signal and a quadrature signal;
   a splitter that distributes the in-phase signal output from the processor to the antenna elements, and distributes the quadrature signal output from the processor to the antenna elements; and
   a plurality of quadrature modulators that are provided to the respective antenna elements, and that generate transmission signals of a radio frequency to be transmitted from the respective antenna elements by performing quadrature modulation on the in-phase signals and the quadrature signals distributed by the splitter, wherein
   the processor is configured to execute a process including
      applying a first frequency shift according to a transmission beam direction to a first oscillation signal that is supplied to the quadrature modulators and used for frequency conversion into the radio frequency, digitally modulating transmission data to generate the in-phase signal and the quadrature signal, and performing complex multiplication to the generated in-phase signal and the generated quadrature signal with a second oscillation signal to which a second frequency shift opposite from the first frequency shift is applied.

2. The wireless communication apparatus according to claim 1, further comprising a delay device that adds a predetermined delay to the first oscillation signal supplied to the quadrature modulators.

3. The wireless communication apparatus according to claim 1, further comprising an oscillator that generates the first oscillation signal to be supplied to the quadrature modulators, wherein
the applying includes applying the first frequency shift to the first oscillation signal generated by the oscillator.

4. The wireless communication apparatus according to claim 1, wherein the performing complex multiplication includes converting the frequencies of the in-phase signal and the quadrature signal from a baseband frequency into an intermediate frequency.

5. A wireless communication apparatus comprising:
a plurality of antenna elements;
a plurality of quadrature demodulators that are provided to the respective antenna elements, and that generate in-phase signals and quadrature signals of an intermediate frequency by performing quadrature demodulation on reception signals;
a combiner that combines the in-phase signals generated by the quadrature demodulators and combines the quadrature signals generated by the quadrature demodulators; and
a processor to which an in-phase signal and a quadrature signal acquired by the combiner are input, wherein
the processor is configured to execute a process including
applying a first frequency shift according to a reception beam direction to a first oscillation signal that is supplied to the quadrature demodulators and used for frequency conversion into the intermediate frequency,
performing complex multiplication to the in-phase signal and the quadrature signal input from the combiner with a second oscillation signal to which a second frequency shift opposite from the first frequency shift is applied; and
digitally demodulating the in-phase signal and the quadrature signal of a baseband frequency acquired by the complex multiplication.

6. The wireless communication apparatus according to claim 5, further comprising a delay device that adds a predetermined delay to the first oscillation signal supplied to the quadrature demodulators.

7. The wireless communication apparatus according to claim 5, further comprising an oscillator that generates the first oscillation signal to be supplied to the quadrature demodulators, wherein
the applying includes applying the first frequency shift to the first oscillation signal generated by the oscillator.

8. The wireless communication apparatus according to claim 5, wherein the performing complex multiplication includes converting the frequencies of the in-phase signal and the quadrature signal from the intermediate frequency into the baseband frequency.

9. A wireless communication method executed by a wireless communication apparatus including a plurality of antenna elements, the wireless communication method comprising:
generating an in-phase signal and a quadrature signal;
distributing the generated in-phase signal to the antenna elements, and distributing the generated quadrature signal to the antenna elements; and
generating a transmission signal of a radio frequency to be transmitted from the respective antenna elements by performing quadrature modulation on the distributed in-phase signal and quadrature signal, wherein
the generating the transmission signal includes
applying a first frequency shift according to a transmission beam direction to a first oscillation signal that is used for frequency conversion into the radio frequency, and
the generating the in-phase signal and the quadrature signal includes
digitally modulating transmission data to generate the in-phase signal and the quadrature signal, and
performing complex multiplication to the generated in-phase signal and the generated quadrature signal with a second oscillation signal to which a second frequency shift opposite from the first frequency shift is applied.

10. A wireless communication method executed by a wireless communication apparatus including a plurality of antenna elements, the wireless communication method comprising:
generating in-phase signals and quadrature signals of an intermediate frequency by performing quadrature demodulation on reception signals in the respective antenna elements;
combining the in-phase signals generated in the respective antenna elements and combining the quadrature signals generated in the respective antenna elements; and
acquiring reception data from the combined in-phase signal and the combined quadrature signal, wherein
the generating the in-phase signals and the quadrature signals includes
applying a first frequency shift according to a reception beam direction to a first oscillation signal that is used for conversion into the intermediate frequency, and
the acquiring the reception data includes
performing complex multiplication to the combined in-phase signal and the combined quadrature signal with a second oscillation signal to which a second frequency shift opposite from the first frequency shift is applied; and
digitally demodulating the in-phase signal and the quadrature signal of a baseband frequency acquired by the complex multiplication.

* * * * *